United States Patent [19]
Saito

[11] Patent Number: 4,956,211
[45] Date of Patent: Sep. 11, 1990

[54] ELASTIC ROLLER AND A PROCESS FOR MANUFACTURING THE SAME

[75] Inventor: Shinji Saito, Shizuoka, Japan

[73] Assignee: Nitto Kogyo Co., Ltd., Tokyo, Japan

[21] Appl. No.: 450,189

[22] Filed: Dec. 13, 1989

[30] Foreign Application Priority Data

Dec. 20, 1988 [JP] Japan ................... 63-319575

[51] Int. Cl.$^5$ ................ B32B 3/26; B32B 1/08
[52] U.S. Cl. .................... 428/36.5; 428/147;
428/318.6; 428/447; 264/46.4
[58] Field of Search ............ 428/36.5, 147, 318.6,
428/447; 264/46.4

[56] References Cited

U.S. PATENT DOCUMENTS 3,640,796 2/1972 Cotelle ....................... 428/316.6

FOREIGN PATENT DOCUMENTS 58-23072 2/1983 Japan .
59-37580 3/1984 Japan .
59-61864 4/1984 Japan .
63-139380 6/1988 Japan .

Primary Examiner—William J. Van Balen
Attorney, Agent, or Firm—Lowe, Price, LeBlanc, Becker & Shur

[57] ABSTRACT

An elastic roller having a layer of foam silicone rubber formed around a roller core and having a skin layer coated with fine silicon resin powder. The elastic roller is fabricated by wrapping a masticated foaming silicone rubber stock containing a foam producing ingredient around a roller core in a foaming silicon rubber stock layer, coating the surface of the foaming silicone rubber stock layer with fine silicone resin powder, placing the roller core coated with the foaming silicone rubber stock layer in the cavity of a mold with its center axis in alignment with that of the cavity, and heating and foaming the foaming silicone rubber stock layer in the mold. The elastic roller is suitable for use on, for example, an electrophotographic apparatus, printers, facsimile terminal equipments and the like as a fixing pressure roller, photoconductive drum cleaning roller, a toner feed roller, a lubricating roller or a transfer roller.

7 Claims, 2 Drawing Sheets

ELASTIC ROLLER AND A PROCESS FOR MANUFACTURING THE SAME

BACKGROUND OF THE INVENTION

1. Field of the Invention

The present invention relates to an elastic roller for an electrophotographic apparatus or the like, and a process of manufacturing such an elastic roller.

2. Description of the Prior Art

Elastic rollers of various different constructions have been proposed for use on electrophotographic apparatus. A rubber roller formed by coating a roller core with an elastic rubber layer is a typical roller for such a purpose. When soft elasticity is essential, a rubber roller is formed by coating a roller core with a sponge rubber layer and coating the circumference of the sponge rubber layer with a heat-resistant elastic layer. Such a roller is disclosed, for example, in Japanese Patent Provisional Publication (Kokai) Nos. 58-23072, 59-37580 and 59-61864. Such a known elastic roller is fabricated through steps of applying an adhesive to the circumference of a roller core, putting a prefabricated sponge rubber tube on the roller core, coating the circumference of the sponge rubber tube with an elastic resin layer, and grinding the elastic resin layer to finish the elastic roller. Another known elastic roller is fabricated through steps of wrapping around a roller core with a masticated rubber stock containing a gas producing ingredient, making the rubber stock foam within a mold, and covering the circumference of the rubber layer with an elastic resin. However, these elastic rollers require a complicated manufacturing process and a high manufacturing cost due to expensive materials. A third known elastic roller is fabricated through steps of wrapping around a roller core with a masticated rubber stock containing a gas producing ingredient, and making the rubber stock form and vulcanizing the foamed rubber within a mold so that a smooth skin layer is formed. Although this elastic roller can be manufactured at a comparatively low manufacturing cost, free toner remaining on a recording sheet and paper powder is liable to adhere to the surface of the elastic roller entailing offset and roller lap-up after the elastic roller has passed about 10,000 recording sheets because the elastic roller has poor release property and the outer surface of it is as glossy and smooth as mirror. If this elastic roller, i.e., the elastic sponge rubber roller with skin, is impregnated with silicone oil to solve such a problem by enhancing the release property, the silicone oil contained in the skin layer swelled with the silicone oil is transferred to recording sheets entailing the contraction and deformation of the foam rubber layer, so that recording sheets are liable to be creased by the elastic roller. Furthermore, the release property of the skin layer becomes ineffective in a short time of operation.

Japanese Patent Provisional Publication (Kokai) No. 63-139380 proposes a pressure roller for fixing. This fixing pressure roller is equipped with a coating layer formed by coating outer surface of a rubber sponge roller with a mixture of a fluororubber and a silicone resin or a fluororesin and hardening the coating of the mixture. However, the coating is worn and removed in the long run by recording sheets and, finally, the skin layer is exposed unavoidably entailing the foregoing problems.

SUMMARY OF THE INVENTION

Accordingly, it is an object of the present invention to provide an elastic roller having soft elasticity, excellent release property and sufficient durability, and capable of effectively functioning for a sufficiently long period of service without causing offset, creasing recording sheets and roller lap-up.

It is another object of the present invention to provide a process of manufacturing such an elastic roller.

In one aspect of the present invention, an elastic roller comprising a roller core, and a foam silicone rubber layer coating the roller core and having a skin layer firmly coated with fine silicone resin powder.

In another aspect of the present invention, an elastic roller manufacturing process comprises coating a roller core with a foaming silicone rubber stock containing a foam producing ingredient to form a layer of the foaming silicone rubber stock coaxially with the roller core, coating the layer of the foaming silicone rubber stock with fine silicone resin powder, and heating the layer of the foaming silicone rubber stock coated with the fine silicone resin powder in a cylindrical mold to complete a foam silicone rubber layer by foaming the foaming silicone rubber stock layer.

Although it is desirable to use a HTV type silicone rubber stock containing a foam producing ingredient which produces a gas upon heating for foaming the foaming silicone rubber stock layer, the present invention is not limited thereto and any suitable material may be used for forming the elastic rubber layer. The foaming silicone rubber stock may contain fine silicone resin powder as a filler. The fine silicone resin powder has high effect on the improvement of the plasticity and workability of the foaming silicone rubber stock.

The present invention employs a cylindrical roller core formed of a suitable material, such as a steel or an aluminum alloy. Preferably, the roller core is coated with an adhesive prior to wrapping a foaming silicone rubber stock around the roller core to enhance the adhesion of the foaming silicone rubber stock to the roller core. The roller core may be coated with a base layer of a resin or rubber depending on the situation.

The foaming silicone rubber stock layer may be formed by any suitable means, such as wrapping a foaming silicone rubber stock sheet around the roller core, wrapping a masticated foaming silicone rubber stock around the roller core by extrusion or application, provided that a foam silicone rubber layer having a uniform thickness can be formed around the roller core.

Preferably, the particle size of the fine silicone resin powder firmly coating the silicone rubber layer is not greater than 12 $\mu$m, more preferably, in the range of 0.5 to 6 $\mu$m. The silicone resin may be softened but must not melt at the vulcanizing temperature. The fine silicone resin powder melting such requirements may be applied to the surface of the foaming silicone rubber stock layer by a dusting method, such as spraying, sprinkling or brushing, or an electrostatic spraying. The foaming silicone rubber stock layer may be coated with the fine silicone resin powder by spraying an emulsion containing the fine silicone resin powder over the surface of the foaming silicone rubber stock layer or immersing the foaming silicone rubber stock layer in the emulsion.

The foaming silicone rubber stock layer coaxially wrapped around the roller core and coated with the fine silicone resin powder is subjected to vulcanizing and foaming process, in which, for example, the foaming silicone rubber stock layer is heated in a mold. During the vulcanizing and foaming process, the fine silicone resin powder applied to the surface of the foaming silicone rubber stock layer disperses into the surface layer of the foaming silicone rubber stock layer and is held firmly therein. The surface of the elastic roller thus fabricated is smooth yet mat, has no adhesiveness specific to rubber and has a lubricous property.

The elastic roller of the present invention is suitable for use on an electrophotographic apparatus particularly as a pressure roller for the fixing unit. Since the particles of the silicone resin powder are firmly held in the skin layer, the silicone resin powder prevents the abrasion of the skin layer of the elastic roller, offset and roller lap-up for a long period of service.

BRIEF DESCRIPTION OF THE DRAWINGS

The above and other objects, features and advantages of the present invention will become more apparent from the following description taken in conjunction with the accompanying drawings, in which.

DESCRIPTION OF THE PREFERRED EMBODIMENT

Embodiment

Figure 1:
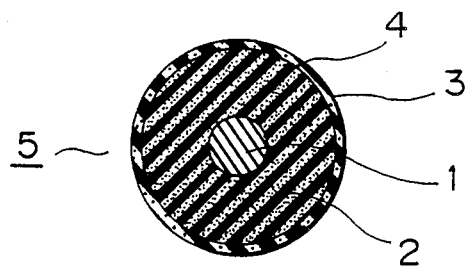
FIG. 1 is a sectional view of an elastic roller in a preferred embodiment according to the present invention.
Figure 2:
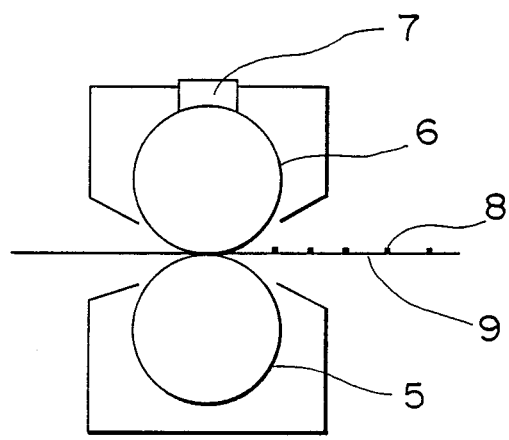
FIG. 2 is a schematic illustration of the elastic roller of FIG. 1 as applied to a fixing unit as a fixing pressure roller for fixing.

An unvulcanized foaming silicone rubber stock (Article number: SE1645U, Toray Silicone K.K.) containing 10 parts of fine silicone resin powder (Trade name: TOSPEARL, Average particle size: 1 $\mu$m, Toshiba Silicone K.K.) was masticated and was wrapped around an iron roller core of 230 mm in length and 10 mm in diameter in an unvulcanized foaming silicone rubber stock layer by extrusion. Then, the surface of the unvulcanized foaming silicone rubber stock layer was coated uniformly with 0.5 g of the fine silicone resin powder by electrostatic spraying to obtain an unvulcanized elastic roller.

Then, the unvulcanized elastic roller was placed fixedly in a cylindrical mold having a cavity of 250 mm in length and 21.5 mm in diameter with its center axis in alignment with that of the cavity and was heated at 200° C. for thirty minutes for foaming and vulcanization to obtain an elastic roller A having a foam silicone rubber layer having a skin layer fixedly holding particles of the fine silicone resin powder. The elastic roller A had an Asker type C hardness of 38°, an outside diameter of 20 mm and very smooth yet mat surface.

Control 1

An elastic roller B as Control 1 having a foam silicone rubber layer having a skin layer was fabricated in the same manner as the elastic roller A. The elastic roller B is the same in construction and materials as the elastic roller A, except that the unvulcanized foaming silicone rubber stock layer was not coated with the fine silicone resin powder in processing the elastic roller B.

The elastic roller B had an Asker type C hardness of 38°, an outside diameter of 20 mm, and a sticky, specularly smooth surface. Particles of the fine silicone resin powder were exposed scarcely on the surface.

Control 2

An elastic roller C as Control 2 was fabricated in the same manner as the elastic roller A, except that a foaming silicone rubber stock used for forming the foam silicone rubber layer contained no fine silicone resin powder, and the foaming silicone rubber stock layer was not coated with the fine silicone resin powder.

The elastic roller C had an Asker type C hardness of 35°, an outside diameter of 20 mm, and a sticky, specularly smooth surface.

Control 3

An elastic roller D as Control 3 was fabricated by coating the elastic roller C with a silicone resin liquid (Article No. 115, Bayer Synthetic Silicone K.K.), and heating the elastic roller C at 150° C. for thirty minutes. The elastic roller D was coated with a 30 $\mu$ thick silicone resin layer.

The elastic roller D had an Asker type C hardness of 37° and an outside diameter of 20.06 mm.

Control 4

An elastic roller E as Control 4 was fabricated by grinding the elastic roller C in an outside diameter of 19 mm, coating the ground surface of the elastic roller C with a silicone rubber (Article No. KE1300, Shinetsu Kagaku Kogyo K.K.), vulcanizing the silicone rubber coating at 150° C. for twenty minutes to form a vulcanized silicone rubber surface, and grinding the vulcanized silicone rubber surface in an outside diameter of 20 mm.

The elastic roller E had an Asker type C hardness of 38°.

Control 5

An elastic roller F as control 5 was fabricated in the same manner and using the same materials as the elastic roller A of the present invention, except that the foaming silicone rubber stock layer was coated with 0.7 g of fine fluororesin powder (Article No. MP-10, Mitsui DuPont Phlorochemical K.K.) instead of 0.5 g of the fine silicone resin powder. The foam silicone rubber layer had a skin layer fixedly holding particles of the fine fluororesin powder.

The elastic roller F had an Asker type C hardness of 38°, and a mat surface. The surface of the elastic roller F was somewhat sticky.

Performance Evaluation

The elastic rollers A, B, C, D, E and F were subjected to comparative performance tests on a copying machine having a fixing unit provided with a heating roller of 20 mm in diameter and 230 mm in length coated with a PFA resin. The test elastic rollers were used as a pressure roller in combination with the heating roller.

Roller Lap-up

Recording sheets each having a solid picture of a color toner having a width of 10 mm and extending across the recording sheet were prepared. When the solid picture arrived at the nipping line between the pressure roller and the heating roller, roller lap-up occurred with the elastic rollers B and C, which proved that the elastic rollers B and C are not fit for use as the pressure roller.

Nipping Width

The elastic rollers A, D, E and F were subjected to a nipping width test. Nipping width was measured by placing an OHP film between the heating roller and a test elastic roller and applying a nipping pressure of 3 kg to the test elastic roller. The fixing properties of the elastic rollers A, D, E and F were measured by a Macbeth densitometer. Although the elastic rollers A, D and F were substantially the same in nipping width, and the hardness of the elastic roller A was higher than that of the elastic roller D, the elastic roller A was most satisfactory.

Durability Test

Variation in the outside diameter of the elastic rollers A, D, E and F was measured after passing 30,000 recording sheets at a fixing speed of six sheets per minute through the fixing unit, and then further recording sheets were passed through the fixing unit to test the durability. The surfaces of the elastic rollers E and F were stained excessively by the toner when 30,000 recording sheets were passed through the fixing unit for each of the elastic rollers E and F, and the further use of the elastic rollers E and F was impossible. The foam silicone resin layer of the elastic roller D worn out, the skin layer of the same was exposed and the surface of the same was stained excessively by the toner when about 80,000 recording sheet were passed through the fixing unit. No trouble arouse in the elastic roller A of the present invention after 150,000 recording sheets were passed through the fixing unit.

Test results are shown in Table 1.

TABLE 1

| Rollers | Hardness (°) | Nipping width (mm) | Fixing property (%) | Diam. variation (mm) | Num. of sheets |
| --- | --- | --- | --- | --- | --- |
| A | 38 | 2.3–3.0 | 75–85 | 0.03 | >150000 |
| B | 38 | — | — | — | 0 |
| C | 35 | — | — | — | 0 |
| D | 37 | 2.4–3.0 | 60–80 | 0.06 | 80000 |
| E | 38 | 2.1–2.9 | 53–77 | 0.2 | 30000 |
| F | 38 | 2.4–3.0 | 70–82 | 0.04 | 30000 |

Figure 3A:
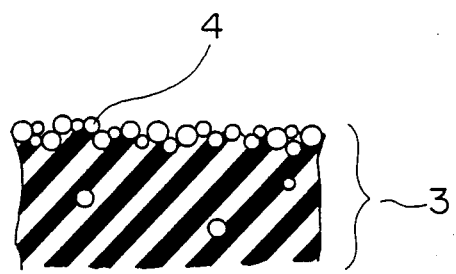
FIG. 3(A) is a fragmentary sectional view showing the condition of the skin layer of the elastic roller of FIG. 1.
Figure 3B:
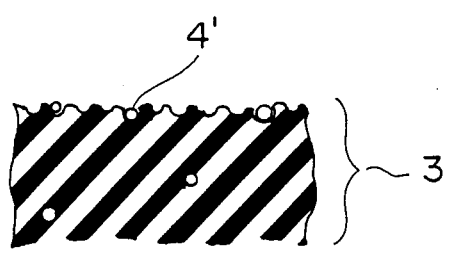
FIG. 3(B) is a fragmentary sectional view showing the condition of the skin layer of an elastic roller as a control.

The sections of the respective surface regions of the elastic roller A of the present invention and the elastic roller F were observed microscopically before subjecting the rollers A and F to the performance tests. As is obvious from FIGS. 3(A) and 3(B), the surface of the elastic roller A is coated firmly with the fine silicone resin powder, while the surface of the elastic roller F is coated partially with the fine fluororesin powder.

The performance tests proved that the elastic roller of the present invention has high abrasion resistance, is capable of preventing offset and roller lap-up for an extended period of service, has a fixing property superior to that of the conventional elastic sponge rubber roller, and is resistant to variation in diameter.

The elastic roller of the present invention can be used for satisfactory function on electrophotographic apparatus as a cleaning roller for cleaning the photoconductive drum, a toner feed roller for the developing unit, a lubricating roller for the fixing unit, a cleaning roller for the fixing unit, and a transfer roller for the transfer unit as well as use as a fixing pressure roller on copying machines, facsimile terminal equipments and printers.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. An elastic roller comprising: a roller core; and a foam silicone rubber layer wrapping around the roller core and having a skin layer fixedly coated with fine silicone resin powder.

2. An elastic roller according to claim 1, intended for use on an electrophotographic apparatus.

3. An elastic roller according to claim 2, intended for use as a cleaning roller for cleaning the photoconductive drum.

4. An elastic roller according to claim 2, intended for use as a toner feed roller on the electrophotographic apparatus.

5. An elastic roller according to claim 2, intended for use as a pressure roller for the fixing unit.

6. An elastic roller according to claim 2, intended for use as a lubricating roller for the fixing unit.

7. A process of manufacturing an elastic roller according to claim 1, comprising steps of: forming a layer of a foaming silicone rubber stock around a roller core; coating the surface of the layer of the foaming silicone rubber stock with fine silicone resin powder; fixedly placing the roller core coated with the layer of the foaming silicone rubber stock within the cavity of a mold with its center axis in alignment with that of the cavity of the mold; and heating the layer of the foaming silicone rubber stock for foaming.

* * * * *